Patented June 3, 1924.

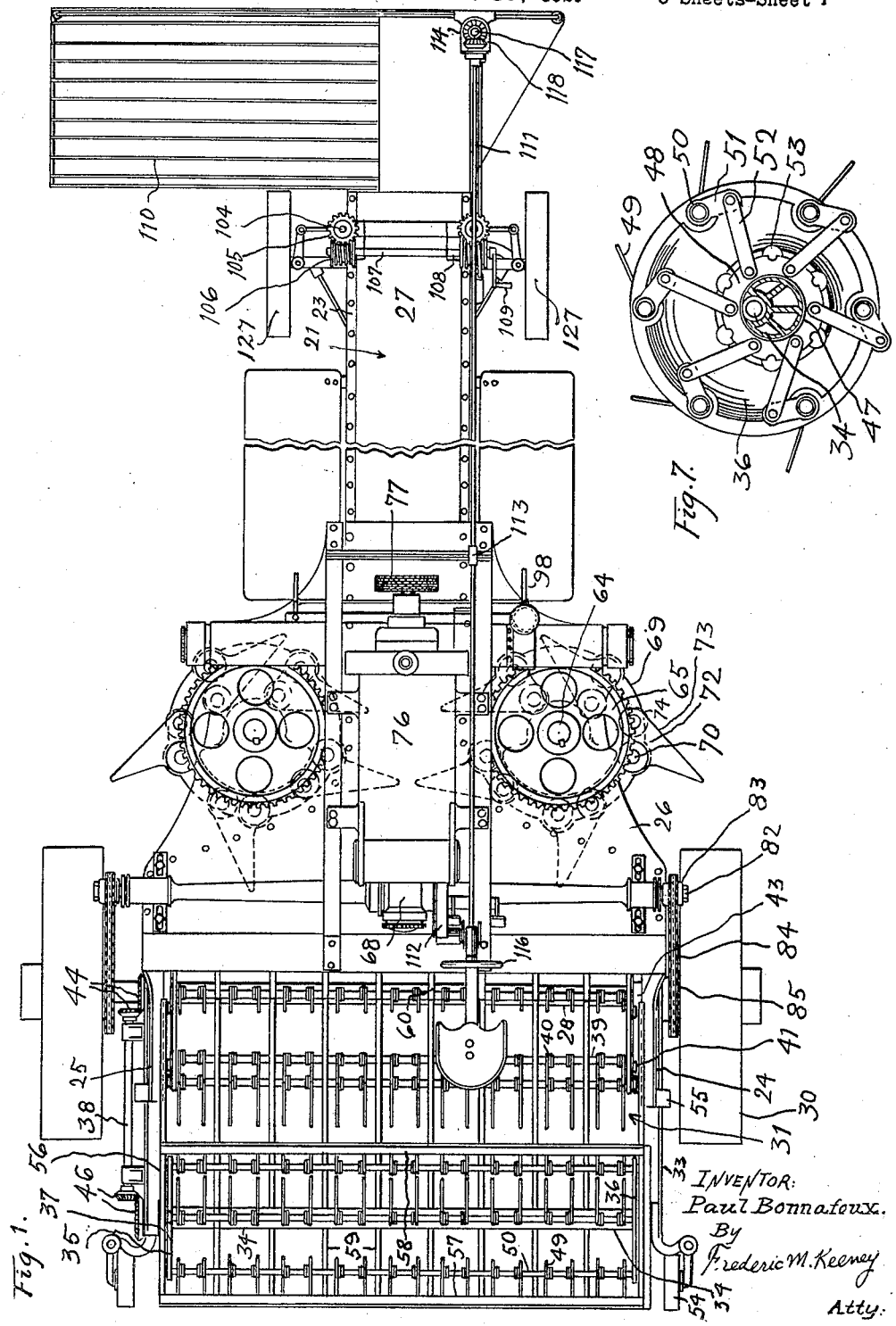

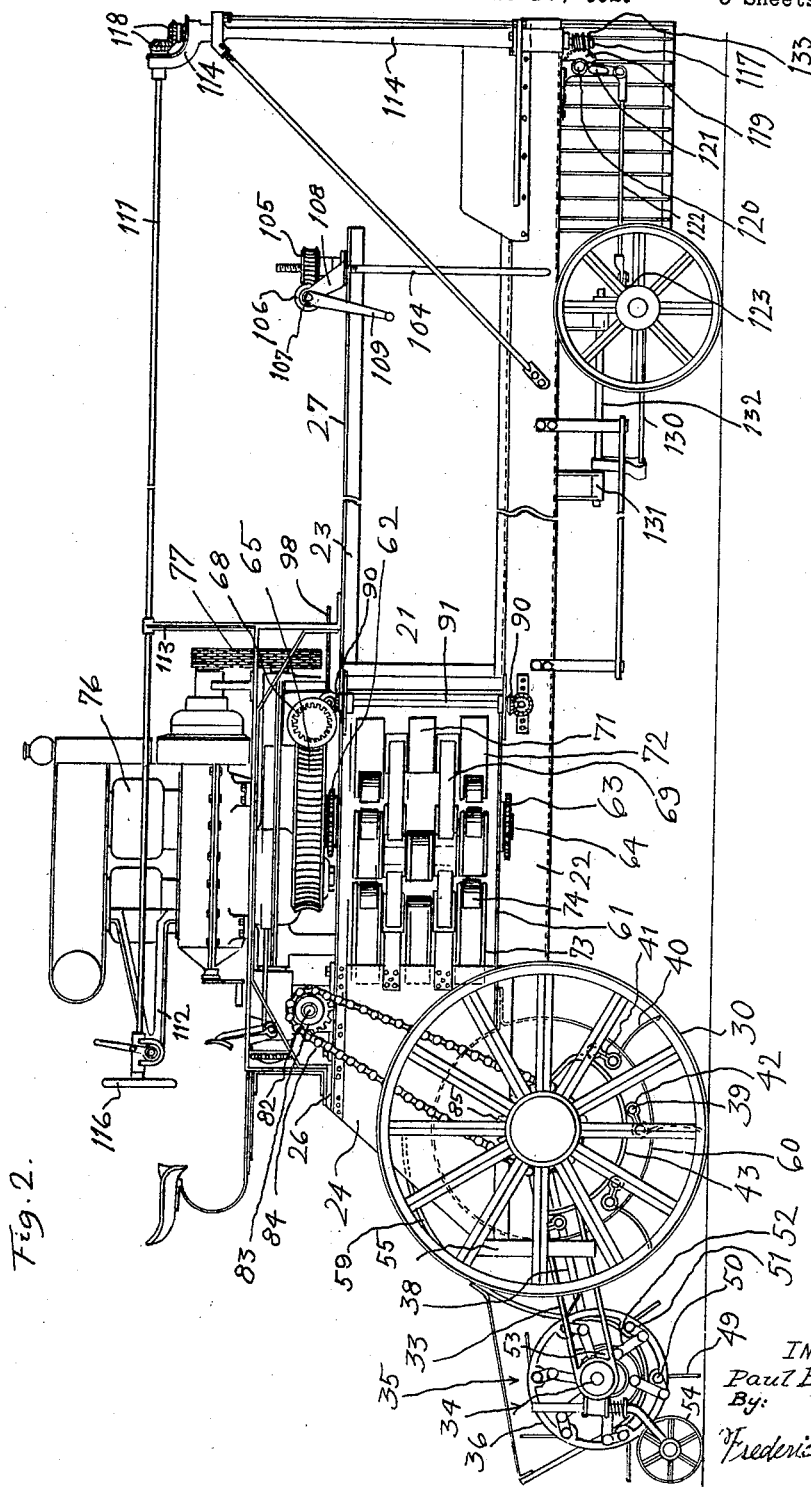

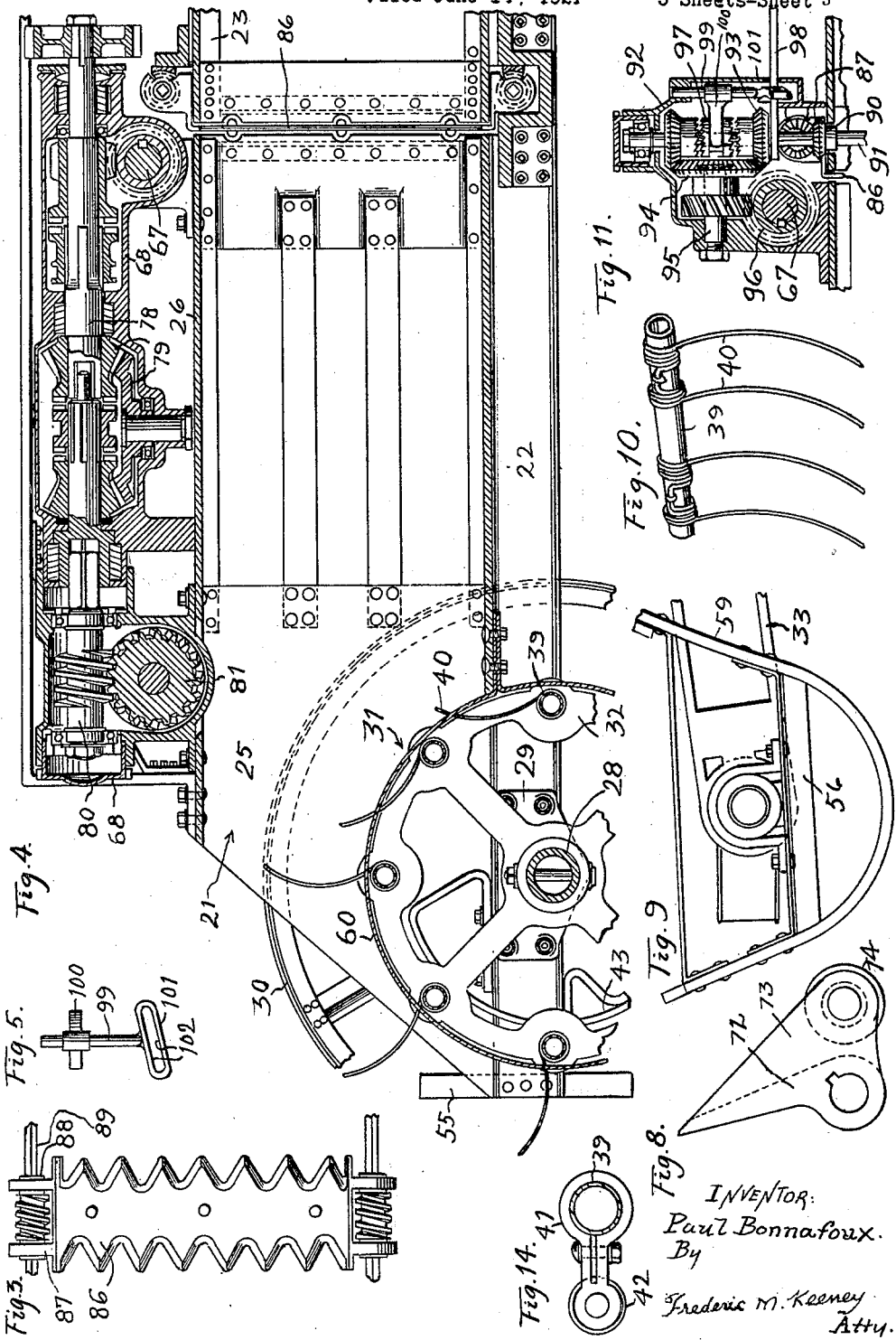

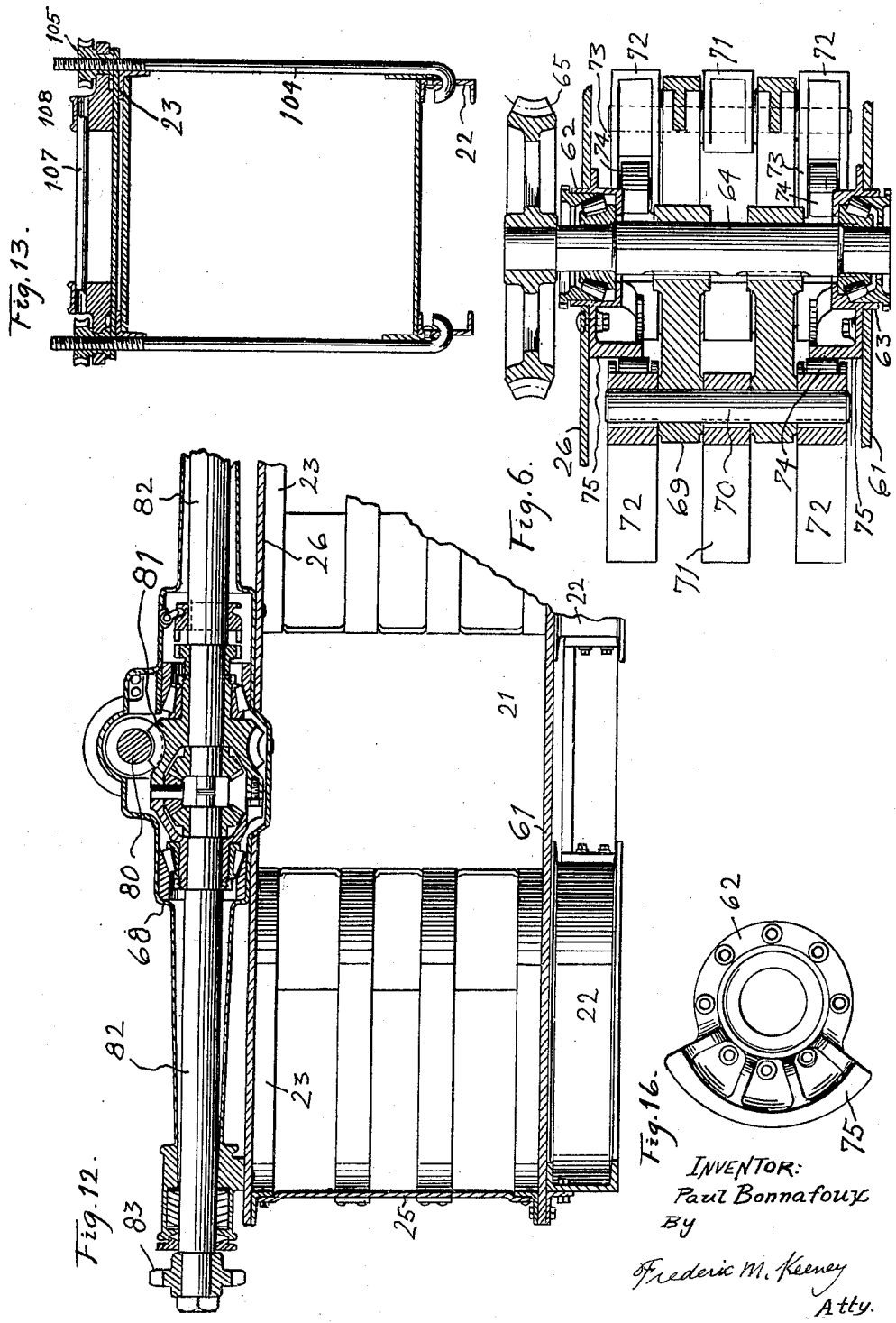

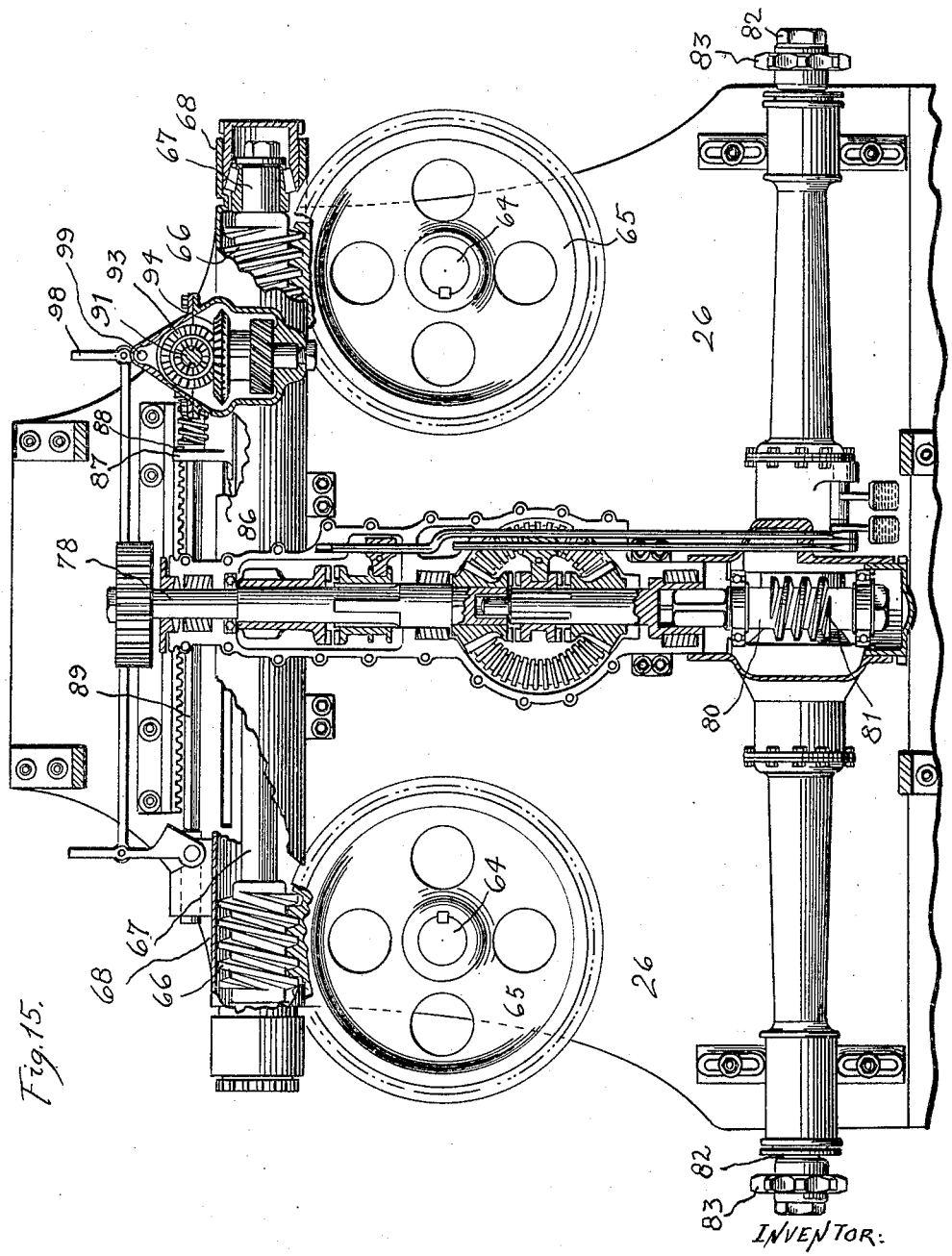

1,496,364

UNITED STATES PATENT OFFICE.

PAUL BONNAFOUX, OF LANCASTER, CALIFORNIA.

SELF-FEEDING HAY PRESS.

Application filed June 14, 1921. Serial No. 477,473.

*To all whom it may concern:*

Be it known that I, PAUL BONNAFOUX, a citizen of the United States, residing at Lancaster, in the county of Los Angeles and State of California, have invented a new and useful Self-Feeding Hay Press, of which the following is a specification.

This invention relates to improvements in machines for baling hay and has for its objects to provide a device of improved construction and arrangement of parts wherein is combined means for gathering the hay from the ground and means for compressing the hay into bales as the device advances to harvest the hay.

To accomplish the objects of the invention, I have provided a device consisting of revolving rakes which gather the hay from the ground, a frame converging to compact the hay, rotary packing and compressing elements operative within the converging frame and adapted to force the hay to the final compressing form, adjustable compressing frame elements, and a severing mechanism to cut the compressed hay into bales of suitable length.

Other objects of the invention relate to improvements in the detailed parts and members of the device.

In the accompanying drawings has been illustrated the preferred form of the invention, but it is to be understood that no limitation is made to the precise structural details therein exhibited, and changes, alterations and modifications which may fall within the scope of the appended claims, may be resorted to if desired.

Upon the annexed drawings, Figure 1 is a top plan view of a hay-press constructed in accordance with the present invention. Fig. 2 is a side elevation of the hay-press. Fig. 3 is a detail and side view of the knife. Fig. 4, is a fragmentary and detail view of the baling chamber in longitudinal section. Fig. 5 is a detail view of the knife-clutch shifting member. Fig. 6 is a sectional detail view of a rotary compressor. Fig. 7 is a detail view showing the cam that operates the auxiliary rake teeth to operative and inoperative position. Fig. 8 is a detail view of a compressor finger. Fig. 9 is a fragmentary detail view showing the swivel connection between the cleaner frame and the auxiliary rake frame. Fig. 10 is a fragmentary detail view of a tooth-bar. Fig. 11 is a fragmentary detail view of the knife operating mechanism. Fig. 12 is a fragmentary detail view of the frame and differential casing. Fig. 13 is a fragmentary and detail view of the means for constricting the forward end of the baling chamber. Fig. 14 is a detail view of a lever-arm for actuating the rake tooth-bars. Fig. 15 is a top plan view of the gear casing with the covers removed. Fig. 16 is a top plan view of a bearing member for the compressor shafts, showing the integral cam thereon.

Referring to the drawings, the compressor and baler which forms the subject of this invention consists of a main baling chamber 21, relatively wide at the rear thereof, converging at the center to compress the hay, and constricted from the central part to the forward end thereof. The baling chamber is formed by lower sills or frame members 22, upper frame members 23, and side plates 24 and 25. Top plate 26 is secured to frame members 23 at the rear end of the baling chamber, and top plate 27 is secured to members 23 to form the top of the baling chamber at the forward end. The main axle 28 is journalled in bearing members 29 which are secured to lower frame members 22. The master wheels 30 are adapted to rotate independently upon the main axle 28, being provided with ratchet clutch elements as hereinafter described, to actuate the main-shaft 28, when the machine is advancing in movement and to rotate independently when reversed in motion. A rotary rake 31 is mounted on the main-axle 28 and adapted to rotate synchronously therewith. The rake 31 consists of end plates 32, in which are journalled the longitudinally disposed tooth-bars 39, provided with rake teeth 40, and with lever-arms 41, on which are mounted rollers 42. Annular guide members 43 secured to the main frame, engage rollers 42 during a portion of the revolution of the rake, thereby holding the teeth 40 in operative position.

The auxiliary frame members 33 are pivotally connected to the main axle 28, and have journalled therein the auxiliary rake shaft 34, on which is mounted the auxiliary rake 35, consisting of a plate 36 and a spider 37. A shaft 38, is journalled in bearings 44, on the left auxiliary frame member. Gear members 44 transmit motion from the main shaft to the countershaft, and gear members 46 from the countershaft to the auxiliary shaft 34. Eccentric bearings 47 are formed integral with the right auxiliary frame member, and a collar 48 is rotatively mounted thereon. The auxiliary rake teeth 49 are mounted on the independently rotative tooth-bars 50, which are provided with lever-arms 51, connected by links 52, with the collar 48, the links working between guides 53.

The auxiliary rake is supported by castor wheels 54, the frame members 33, being maintained in alignment by guides 55, on frame members 22. Tiltable frame members 56 are pivotally connected to members 33, and are connected by transverse frame members 57 and 58 to which are secured the cleaners 59, adapted to strip the hay from both rakes. Annular cleaners 60, encircle the main rake, and are secured to the bottom chamber plate 61. The rake teeth and cleaners co-act to deliver the gathered hay to the baling chamber. The arrangement is such that the main and auxiliary rakes are adapted to rotate in contrary directions, and the eccentric bearing 47, actuates the auxiliary rake teeth to operative position when adjacent to the ground, and to a relatively inoperative position when opposed to the main rake teeth.

Upper bearing members 62 and lower bearing members 63, fixed, respectively, to the top and bottom plates, have journalled therein the compressor shafts 64, provided at the top with worm gear members 65 which are driven by the worms 66, on wormshaft 67 rotatively mounted in a casing 68. The compressor shafts 64, are provided with spiders 69, in which are journalled the finger shafts 70, on which are mounted the compressor fingers 71 and 72. Fingers 72 have lugs 73, in which are journalled the rollers 74, which are adapted to engage with fixed cam members 75, on the bearing members 62 and 63, and thereby hold the compressor fingers in operative position during a portion of the revolution of the compressors, the fingers forcing the hay into the forward portion of the baling chamber.

A motor 76, mounted on the top of the baling chamber, through the chain and gear connection 77, serves to actuate the main drive shaft 78, and through the reversing gears 79, is adapted to drive the jack-shaft 80, mounted in casing 68, and in alignment with the drive shaft 78. Through the worm-gear transmission 81, the jack-shaft drives the differential shafts 82, which are provided with sprocket pinions 83, connected by chains 84, with sprocket gears 85, on the master-wheels.

A knife 86 operates transversely through the frame and is provided at the top and bottom with lugs 87, in which are journalled the rotatable collars or bearings 88. Square-sectioned shafts 89 are slidingly mounted in collars 88, and are driven through the gears 90, by shaft 91. Clutch pinions 92 and 93, are independently rotative and mounted on shaft 91, and are driven in opposite directions by the gear-wheel 94, on a stud shaft 95. The gear member 94 is in turn driven by a worm 96, on countershaft 67, which drives the compressors. A clutch member 97, slidably mounted on shaft 91, may be shifted into engagement with clutch pinions 92 and 93, thereby driving shaft 91 in opposite directions, and correspondingly actuating the knife. A lever 98, pivotally mounted on shaft 91, may be manually shifted to operate the clutch member. A clutch shaft 99, provided with a clutch fork 100 in engagement with clutch member 97, is provided with a slotted head 101, arranged with inclined cam edges 102, the clutch lever 98, working in the slotted head 101. As the knife approaches the limit of its stroke in either direction, the clutch lever engages with an approaching knife lug 87 and is shifted to central or inoperative position thereby, through engagement with slotted head 101, shifting the clutch to inoperative position. To reverse the movement of the knife, the lever is then shifted to the reverse position. In either of the inoperative positions of the knife, the clutch lever abuts against a lug on the knife, which prevents the manipulation of the lever to a wrong position by the operator.

As each portion of the compressed hay is severed by the knife, the operators may apply the bunding wires thereto. The projections 134 on the knife having cut channels on contiguous ends of the bales, the ordinary binding wires, such as are now in use and provided with a looped end, may be inserted through the openings formed by said channels, by the operators, and the tying operation may be completed as the bale advances along the constricted forward portion of the baling chamber. Bars 104, connected to frame members 22, extend upward, being provided with threaded pinions 105, operated simultaneously by worm pinions 106, on shaft 107, which is journalled in bearings 108, fixed to the top frame members 23, the shaft 107 being provided with a handle 109 which may be manipulated by the operator to constrict the baling chamber at the forward end thereof, and thereby further compress the bale after the tying operation.

As the bales are forced from the baling chamber at the forward end, they will slide down upon the inclined chute 110, and are deposited upon the ground and out of the path of the advancing rakes at the rear of the machine.

The steering means consist of a shaft 111, journalled in the bracket standard 112, standard 113, and bearing 114, on the tubular casing 115. A steering wheel 116 is mounted on shaft 111. Motion is transmitted to a vertical shaft 117, through the gears 118, and a worm 133, on shaft 117, actuating a sector 119, on shaft 120, provided with a steering arm 121, which is connected by a drag-link 122, with lever 123, thereby, through suitable mechanism such as found in common use on automobiles, turning the front wheels for steering the machine. Reach-rods 130 and shaft 132, connect the front axle with the depending bracket 131.

From the foregoing it may be seen that I have provided simple and efficient means for automatically gathering the hay and compressing the same into bales. The operators, may, by manipulation of the clutch lever 98, set the knife in operation to cut the hay into bales of suitable length, and then pass the binding wires around the severed portions, and, as the bales approach the forward end and are fully compressed, the bales are tied. The operation of the hay press is practically continuous.

What is claimed is:

1. In a self-feeding hay-press, a frame enclosing a baling chamber and converging at the front thereof, means for feeding the hay into the baling chamber at the rear part thereof, rotary compressing elements to force the hay toward the front of the baling chamber, and severing means located in the chamber adjacent to the compressing elements.

2. In a self-feeding hay-press, a frame enclosing a baling chamber and converging at the front thereof, rotary feeders carrying the hay into the baling chamber at the rear thereof, strippers interposed between the feeders, rotary compressors, compressor fingers carried by the compressors and extending into the baling chamber, means for actuating the rotary compressors, and cam members to force the fingers into operative position within the baling chamber.

3. In a self-feeding hay-press, a frame converging at the forward end, side plates fixed to the frame and forming therewith a baling chamber, rotary compressors, means for actuating the rotary compressors, fingers on the rotary compressors, and means for forcing the fingers into operative position during a portion of the rotary movement of the compressors, said fingers extending into the baling chamber in the operative position.

4. In a self-feeding hay-press, a frame enclosing a baling chamber, means for feeding the hay into the chamber at the rear thereof, means for compressing the hay within the chamber, a knife adapted to move transversely relatively to the frame and sever the compressed hay, means for actuating the knife, a clutch to control the knife-actuating means, a lever to operate the clutch to operative and inoperative position, and means carried by the knife to shift the clutch lever to inoperative position as the knife approaches the limit of its cutting stroke.

5. In a self-feeding hay-press, a frame enclosing a baling chamber, means for feeding the hay into the chamber at the rear thereof, means for compressing the hay within the chamber, means for severing the compressed hay into bales, and a chute at the forward end of the frame to receive the bales and deposit them upon the ground.

6. In a self-feeding hay-press, a frame enclosing a baling chamber, means for feeding the hay into the chamber at the rear thereof, means for compressing the hay within the chamber, a knife sliding transversely relatively to the frame and having oppositely disposed cutting edges, and means for operating the knife alternately in opposite directions to sever the compressed hay into bales.

7. The combination with a frame enclosing a baling chamber and master-wheels supporting the frame, of rake members rotatively mounted relative to the frame, means whereby the rake members are driven in contrary directions by the movement of the master-wheels, means for guiding the hay from the rakes to the baling chamber, compressors operative within the chamber, means for cutting the hay into bales after compression thereof, and a chute disposed at the forward end of the baling chamber and arranged to convey the bales out of the path of the advancing rake members.

8. In a self-feeding hay-press, a frame enclosing a baling chamber, master-wheels to support the frame, a rotary rake drum, rake teeth secured to the drum, bearing members secured to the frame, a main-shaft journalled therein, auxiliary frame members pivotally connected to the main shaft, and depending at the rear of the main rake drum, an auxiliary rake drum carried by the auxiliary frame members, a tiltable frame pivotally connected to the auxiliary frame members, cleaners carried by the tiltable frame and serving to clean the rake teeth on the main and auxiliary rake drums, and means whereby the rake drums are driven in contrary directions by the movement of the master-wheels.

9. In a self-feeding hay-press, a frame enclosing a baling chamber, master-wheels supporting the frame, rotary drums actuated by the rotative movement of the master-wheels, independently rotatable tooth-bars mounted on the rotary drums, rake teeth carried by the tooth-bars and adapted to feed the hay into the baling chamber, lever-arms secured to the tooth-bars, rollers mounted on the lever-arms, curved guides supported by the main frame and engaging with the lever-arm rollers to actuate the rake teeth to operative position during a portion of the revolution of the rake drums, means for compressing the hay within the baling chamber, and severing means for the compressed hay adjacent to the compressing means.

10. In a self-feeding hay-press, a frame enclosing a baling chamber, means for feeding the hay into the chamber at the rear thereof, rotary compressor members, means for actuating the rotary compressor members, compressor fingers carried by the compressor members, lever-arms integral with the fingers, rollers carried by the lever-arms, and cam members fixed to the frame and adapted to engage with the lever-arm rollers to actuate the fingers to operative position within the baling chamber during a portion of the revolution of the rotary compressors, said fingers being retracted to inoperative position during the remaining portion of the rotary movement of the compressors by the compressed hay within the baling chambers.

11. In a self-feeding hay-press, a frame enclosing a baling chamber, means for feeding the hay into the baling chamber at the rear thereof, rotary compressors, fingers on the compressors extending into the baling chamber in the operative position, means for severing the compressed hay into bales in advance of the tying operation, and means for further compressing the bales after the shearing operation.

12. In a self-feeding hay-press, a frame enclosing a baling chamber, means for feeding the hay into the chamber at the rear end thereof, rotary compressors working within the baling chamber, severing means to cut the compressed hay into bales and moving transversely through the frame and within the chamber, means for actuating the severing means, manually-actuated means operative for placing the severing means in operation, and means for automatically releasing the actuating means at the end of the cutting stroke.

13. In a self-feeding hay-press, the combination with a frame, side-plates, top-plates, and a bottom plate enclosing a baling chamber, a main-shaft journalled in the frame, and master-wheels mounted on the main shaft, of an auxiliary frame pivotally connected to the main-shaft and depending at the rear of the main frame, a rotary rake member mounted on the main-shaft, an auxiliary shaft journalled in the auxiliary frame, an auxiliary rake member mounted on the auxiliary shaft, means whereby the rake members are driven by the movement of the master-wheels and in opposite rotary directions to feed the hay into the baling chamber, independent rotary compressor members working within the baling chamber, means for actuating the rotary compressor members in opposite rotary directions to compress the hay within the baling chamber, and means for severing the compressed hay into bales.

14. In a self-feeding hay-press, the combination with a frame, side-plates, top-plate and a bottom plate enclosing a baling chamber, a main-shaft journalled in the frame, master-wheels rotatively mounted on the main-shaft, means for actuating the master-wheels with a rotary movement, and ratchet clutches to operatively connect the master-wheels with the main-shaft, of an auxiliary frame pivotally connected to the main-shaft and depending at the rear of the main frame, a rotary rake mounted on the main-shaft, an auxiliary shaft journalled in the auxiliary frame, an auxiliary rake mounted on the auxiliary shaft, means whereby the rakes are driven by the movement of the master-wheels and in opposite rotary directions, stripper members interposed between the rake members and serving to convey the hay from the rake members to the baling chamber, means for compressing the hay within the chamber, and severing means operating within the chamber adjacent to the compressing means.

15. The combination with a frame and plates enclosing a baling chamber, and master-wheels supporting the frame, of rakes rotatively mounted relative to the frame, means whereby the rakes are driven by the master-wheels and in opposite rotary directions, stripper members interposed between the rakes, of which some of the stripper members are relatively fixed in position and some are relatively tiltable to guide the hay to the baling chamber, compressors operative within the baling chamber, and means for cutting the compressed hay into bales after compression thereof.

16. In a self-feeding hay-press, a frame enclosing a baling chamber having a relatively wide rear portion, a converging central portion, a constricted front portion, and master-wheels supporting the frame, of oppositely rotative rake members serving to feed the hay into the relatively wide rear portion of the baling chamber, said rake members being operated by the rotation of the master-wheels, independently rotative compressor members working in the converging portion of the baling chamber, means for actuating the rotative compressor members, shearing elements working in the constricted portion of the baling chamber to cut the compressed hay into bales, means for operating the shearing elements independently of the raking members and compressing members, a manually-actuated clutch for throwing the actuating means for the shearing elements into operative position, and means for automatically releasing the clutch as the shearing elements approach the limit of their operative movement.

17. In a self-feeding hay-press, the combination with a frame, side-plates, top-plate and bottom plate enclosing a baling chamber, and master-wheels supporting the frame, of rake members rotatively mounted relative to the frame, means whereby the rake members are driven in contrary directions by the movement of the master-wheels, means for guiding the hay from the rakes to the baling chamber, a casing superposed on the top plate, a drive-shaft, means for actuating the drive shaft, a jack-shaft extending coaxially with the drive shaft, reversing gearing mounted within the casing and actuated by the drive-shaft, a clutch serving to engage the jack-shaft with the reversing gearing, a worm integral with the jack-shaft, a worm-gear driven by the worm on the jack-shaft, said worm-gear serving as a differential housing, differential gears and pinions encased by the differential housing, differential shafts journalled in the casing and extending transversely relative to the baling chamber, sprocket gears on the differential shafts, sprocket gears on the master-wheels, a chain connecting the sprocket gears, vertically-extending compressor shafts rotatively mounted on opposite sides of the baling chamber, worm-gears mounted on the compressor shafts, a countershaft extending transversely relative to the baling chamber and journalled in the shaft casing, a gear transmission interposed between the drive-shaft and countershaft, worms fixed to the countershaft and in engagement with the worm gears on the compressor shafts, a manually actuated clutch to control the gear transmission between the drive and countershafts, spiders fixed to the compressor shafts and rotating synchronously therewith, finger-shafts journalled in the compressor spiders, fingers fixed to the finger-shafts and adapted to extend within the baling chamber in operative position, cams fixed to the top and bottom plates and engaging with the fingers to force them into their operative position during a portion of the revolution of the compressor shafts, a knife operating transversely within the compressing chamber and serving to cut the hay into bales, means for actuating the knife alternately in opposite directions, a gear transmission between the knife actuating means and the countershaft, a manually operated clutch shiftable to operative position to control the gear transmission between the countershaft and knife actuating means, and means for automatically releasing the clutch as the knife approaches the limit of each cutting stroke.

18. In a self-feeding hay-press, the combination with a main frame, side-plates, top plate and bottom plate enclosing a baling chamber, a main-shaft journalled in the main frame, and master-wheels mounted on the main shaft and supporting the baling chamber, of motive means for actuating the master-wheels to advance the press, an auxiliary frame pivotally connected to the main-shaft, and depending at the rear of the main frame, a rotary rake member mounted on the main shaft, an auxiliary shaft journalled in the auxiliary frame, rake heads fixed to the auxiliary shaft, transversely-extending tooth-bars journalled in the rake heads, lever-arms fixed to the tooth-bars, eccentric cam members fixed to the auxiliary frame, a collar mounted on the fixed eccentric cam member, and rotating with the adjacent rake head, links connected to the rotating collar and to the lever-arms on the tooth-bars, teeth on the tooth-bars, operated by the eccentric cam to operative position as they approach the ground and to a relatively inoperative position when opposed to the main rotary rake member, independently rotatable tooth-bars mounted on the main rake member, rake teeth on the last-named tooth-bars and adapted to feed the hay into the baling chamber, lever-arms secured to the last-named tooth-bars, rollers carried by the last-named lever arms, curved guides supported by the main frame and engaging with the lever-arm rollers to actuate and maintain the rake teeth on the main rake member in operative position relative to the rear rake member, means whereby the rake members are actuated by the movement of the master-wheels and in opposite rotary directions, means for compressing the hay within the baling chamber, and severing means for cutting the compressed hay into bales.

19. In a self-feeding hay-press, a main frame enclosing a baling chamber, a main shaft journalled in the main frame, master-wheels actuating the main shaft, a rake member fixed to the main shaft and rotating synchronously therewith, annular cleaners fixed to the main frame at the rear of the baling chamber and encircling the rake-member, rake-teeth on the main rake member extending between the annular cleaners during a portion of the revolution of the rake member, an auxiliary frame pivotally connected to the main shaft and depending at the rear of the main frame, an auxiliary rake member rotatively mounted on the auxiliary frame, means for rotating the main and auxiliary rake members in contrary directions, a cleaner frame pivotally mounted relative to the auxiliary frame and tiltable thereon, cleaners fixed to the tiltable frame and extending over the annular cleaners and cooperating therewith to feed the hay into the baling chamber, means for compressing the hay within the baling chamber, and severing means working within the baling chamber and adjacent to the compressing means.

20. In a self-feeding hay-press, a frame enclosing a baling chamber, means for feeding the hay into the chamber at the rear thereof, means for compressing the hay within the chamber, a knife adapted to move transversely relative to the frame and sever the compressed hay, projections on opposite sides of the knife and serving to cut passage grooves on the ends of the bales for the tying elements, means for actuating the knife, a clutch manually operated to place the knife-actuating means in operation, and stops on the knife to disengage the clutch as the knife approaches the limit of its cutting stroke.

21. In a self-feeding hay-press, the combination with a frame and top and bottom plates converging to form a baling chamber to compress the hay, of master-wheels supporting the frame, means to revolve the master-wheels to advance the hay-press, a plurality of revolving rakes to gather the hay from the ground, means whereby the movement of the master-wheels serves to revolve the rakes in opposite directions, stripper elements arranged to guide the hay from the rakes to the baling chamber, rotary packing and compressing devices to force the hay to the final compressing forms, adjustable compressing forms at the forward and constricted end of the baling chamber, and a severing mechanism operative within the baling chamber and adjacent to the packing and compressing devices.

22. In a self-feeding hay-press, a frame enclosing a baling chamber, means for feeding the hay into the chamber at the rear thereof, means for compressing the hay within the chamber, a double-edged knife adapted to operate alternately in opposite directions and transversely relatively to the baling chamber and sever the compressed hay, teeth disposed on opposite edges of the knife, a series of projections on opposite sides of the knife and serving to cut passage grooves on abutting ends of the bales for the tying elements, lugs on opposite ends of the knife and projecting above the baling chamber at the top thereof, and below the baling chamber, revoluble bearing members journalled in said lugs and having approximately square shaft holes therein, revoluble shafts above and below the baling chamber and mounted in said revoluble bearing members, said shafts having a square section to correspond with the shaft holes, worm-gear members mounted on the revoluble shafts and disposed between the lugs on the knife, means for actuating the revoluble shafts to operate the knife within the chamber, a clutch to control the shaft-actuating means, manually operated means for throwing the clutch into operative position, and cams on the lugs arranged to disengage the clutch at the limit of the knife cutting stroke.

PAUL BONNAFOUX.